(12) United States Patent
Povlick et al.

(10) Patent No.: US 8,063,955 B2
(45) Date of Patent: Nov. 22, 2011

(54) CAMERA MODULE TESTING

(75) Inventors: Timothy R. Povlick, San Diego, CA (US); Jingqiang Li, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 400 days.

(21) Appl. No.: 12/419,657

(22) Filed: Apr. 7, 2009

(65) Prior Publication Data

US 2010/0253810 A1    Oct. 7, 2010

(51) Int. Cl.
*H04N 9/68* (2006.01)
(52) U.S. Cl. ........ 348/234; 348/187; 348/222.1
(58) Field of Classification Search .......... 348/180, 348/187, 188, 222.1, 234
See application file for complete search history.

(56) References Cited

U.S. PATENT DOCUMENTS

| | | | |
|---|---|---|---|
| 3,912,395 A | | 10/1975 | Voggenthaler |
| 4,410,268 A | * | 10/1983 | Tamaki ................. 356/124 |
| 5,818,572 A | | 10/1998 | Pappas et al. |
| 6,285,799 B1 | | 9/2001 | Dance et al. |
| 2006/0041787 A1 | * | 2/2006 | Knoedgen et al. ........... 714/25 |
| 2008/0288214 A1 | * | 11/2008 | Wu et al. .................. 702/186 |

* cited by examiner

*Primary Examiner* — Gevell Selby
(74) *Attorney, Agent, or Firm* — Matthew J. Evans; James R. Gambale, Jr.

(57) ABSTRACT

In a particular embodiment, a method is disclosed that includes illuminating an opaque mask having a plurality of holes formed therein, each hole of the plurality of holes having a predetermined size. The method includes forming a two-dimensional impulse response image of the illuminated opaque mask using a camera module. The method further includes determining at least one optical characteristic of the camera module based on the two-dimensional impulse response image of the illuminated opaque mask.

25 Claims, 9 Drawing Sheets

CAMERA MODULE TESTING

FIELD OF THE DISCLOSURE

The present disclosure is generally directed to camera module testing and correction.

BACKGROUND

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless telephones include other types of devices that are incorporated therein. For example, wireless telephones can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Digital signal processors (DSPs), image processors, and other processing devices are frequently used in portable personal computing devices that include digital cameras, or that display image or video data captured by a digital camera. Such processing devices can be utilized to provide video and audio functions, to process received data such as image data, or to perform other functions.

One type of image processing involves correcting and improving overall optical performance of camera modules. Camera modules including a lens system and an image sensor are commonly supplied to wireless telephone manufacturers as a complete unit. Camera modules may optionally include a focus device or mechanism, an autoexposure device, or any combination thereof. These elements make up the front end of a camera and are referred to as a camera module. Camera modules are generally tested to ascertain their overall optical performance. Typically, an image of a reflective test target is taken using the camera module. The target has various patterns thereon to measure lens sharpness. To measure additional parameters, such as vignetting and lens tilt, additional test targets and images would need to be captured and analyzed. In addition, the camera module and the various test targets need to be carefully aligned. Such an ad-hoc testing procedure is tedious, time consuming, and prone to error.

SUMMARY

An opaque mask having a number of holes may be illuminated from the rear of the opaque mask. Each of the holes may have a predetermined size such that a camera module is unable to resolve some of the holes, which then become point sources of illumination for the camera module. A two-dimensional impulse response image of the illuminated opaque mask may be formed using the camera module. The two-dimensional impulse response image of the illuminated opaque mask may include a point spread function of the camera module for each hole that is a point source of illumination. At least one optical characteristic of the camera module may be determined based on the two-dimensional impulse response image of the illuminated opaque mask.

In a particular embodiment, a method is disclosed that includes illuminating an opaque mask having a plurality of holes formed therein, each hole of the plurality of holes having a predetermined size. The method includes forming a two-dimensional impulse response image of the illuminated opaque mask using a camera module. The method further includes determining at least one optical characteristic of the camera module based on the two-dimensional impulse response image of the illuminated opaque mask.

In another embodiment, a method is disclosed that includes illuminating an opaque mask having a plurality of holes formed therein, each hole of the plurality of holes having a predetermined size, where the predetermined size is such that a camera module is unable to resolve a set of the plurality of holes. The method includes forming a two-dimensional impulse response image of the illuminated opaque mask using the camera module, where the two-dimensional impulse response image of the illuminated opaque mask includes a point spread function of the camera module for each hole of the set of the plurality of holes. The method further includes determining at least one optical characteristic of the camera module based on the two-dimensional impulse response image of the illuminated opaque mask.

In another embodiment, an apparatus is disclosed that includes an opaque mask having a plurality of holes formed therein, each hole of the plurality of holes having a predetermined size. The apparatus also includes a source of illumination configured to illuminate the opaque mask forming a two-dimensional impulse response image of the illuminated opaque mask using a camera module. The apparatus further includes a processor configured to determine at least one optical characteristic of the camera module based on the two-dimensional impulse response image of the illuminated opaque mask.

In another embodiment, an apparatus is disclosed that includes means for illuminating an opaque mask having a plurality of holes formed therein, each hole of the plurality of holes having a predetermined size. The apparatus includes means for forming a two-dimensional impulse response image of the illuminated opaque mask using a camera module. The apparatus further includes means for determining at least one optical characteristic of the camera module based on the two-dimensional impulse response image of the illuminated opaque mask.

In another embodiment, a computer-readable medium storing computer executable code is disclosed. The computer-readable medium includes code for illuminating an opaque mask having a plurality of holes formed therein, each hole of the plurality of holes having a predetermined size. The computer-readable medium includes code for forming a two-dimensional impulse response image of the illuminated opaque mask using a camera module. The computer-readable medium further includes code for determining at least one optical characteristic of the camera module based on the two-dimensional impulse response image of the illuminated opaque mask.

One particular advantage provided by disclosed embodiments is that a variety of tests can be performed using a single target and an alignment precision for testing of the optical elements is reduced.

Another advantage provided by disclosed embodiments is that image analysis is simplified, enabling a fully automated solution.

Other aspects, advantages, and features of the present disclosure will become apparent after review of the entire application, including the following sections: Brief Description of the Drawings, Detailed Description, and the Claims.

DETAILED DESCRIPTION

Figure 1:
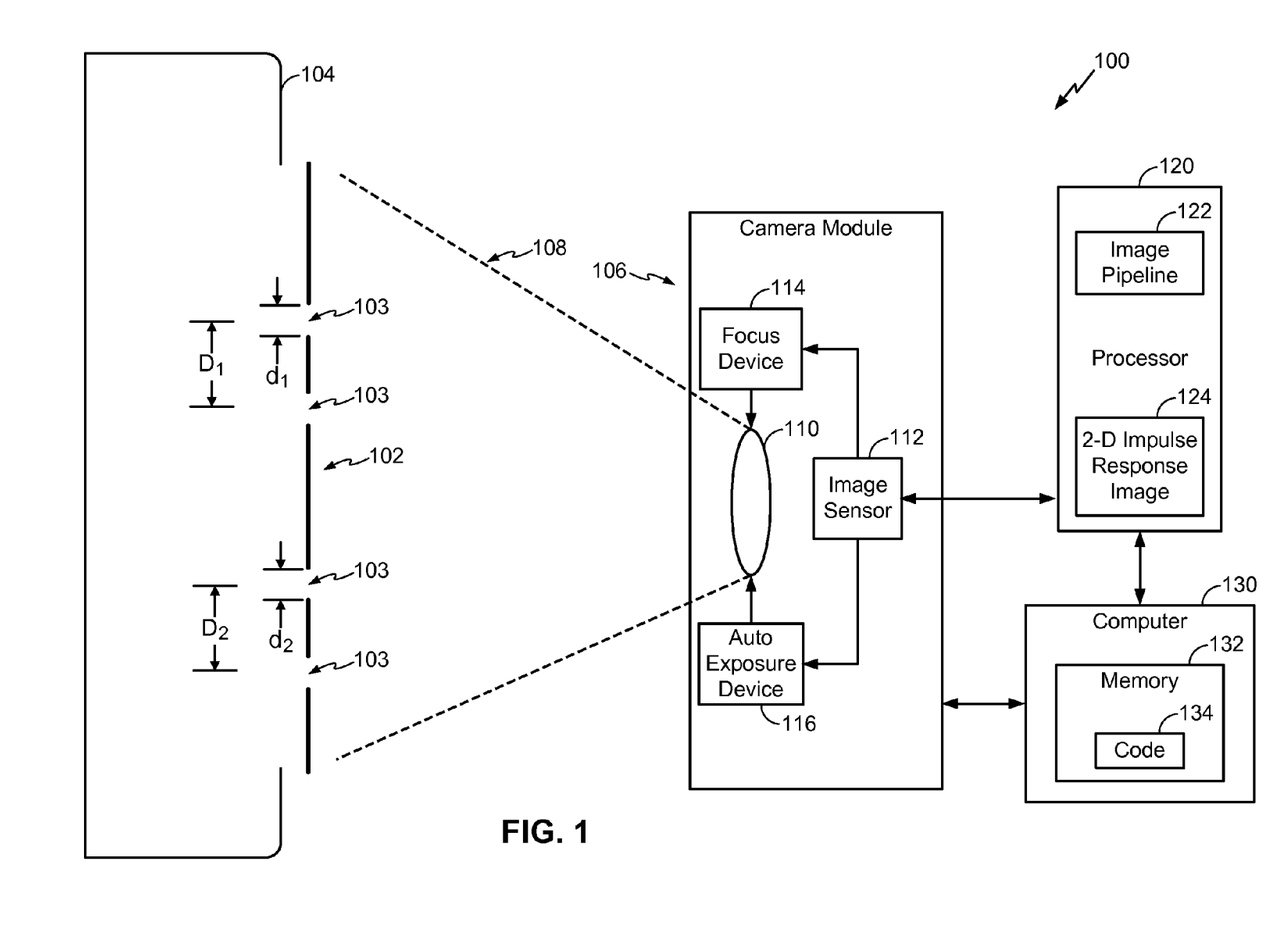
FIG. 1 is a block diagram of a particular illustrative embodiment of camera module testing apparatus.

Referring to FIG. 1, a particular embodiment of a camera module testing apparatus 100 is illustrated. The camera module testing apparatus 100 includes an opaque mask 102 having a plurality of holes 103 formed therein. The camera module testing apparatus 100 also includes a source of illumination 104 configured to illuminate the opaque mask 102 within a field of view 108 of a camera module 106. The camera module testing apparatus 100 further includes a processor 120 coupled to the camera module 106. The camera module testing apparatus 100 also includes a computer 130 coupled to the processor 120 and also coupled to the camera module 106.

The opaque mask 102 has the plurality of holes 103 formed therein, each hole of the plurality of holes 103 having a predetermined size. For example, as shown in FIG. 1, one hole of the plurality of holes 103 may have a diameter $d_1$, while another hole of the plurality of holes 103 may have a diameter $d_2$. Similarly, the distance between the holes may also be predetermined. For example, as shown in FIG. 1, one pair of holes of the plurality of holes 103 may be separated by a distance $D_1$ while another pair of holes of the plurality of holes 103 may be separated by a distance $D_2$. The distribution of the plurality of holes 103 on the opaque mask 102 may be used to detect focus uniformity of the camera module 106. The distribution of the plurality of holes 103 at the periphery of the opaque mask 102 may be used to detect vignetting or lens roll-off of the camera module 106. The spacing between the plurality of holes 103 on the opaque mask 102 may be used to detect the resolution of the camera module 106. The gaps between the plurality of holes 103 on the opaque mask 102 may be used to detect the black level performance of the camera module 106. Patterns in the plurality of holes 103 on the opaque mask 102, such as parallel lines, perpendicular lines, squares, rectangles, and the like, may be used to detect geometrical distortions of the camera module 106.

The source of illumination 104 is configured to illuminate the opaque mask 102 forming a two-dimensional impulse response image of the illuminated opaque mask 102 using the camera module 106. The source of illumination 104 may include an incoherent source of illumination such as an incandescent bulb, a halogen lamp, an array of light-emitting diodes (LEDs), a coherent source of illumination such as a laser, or any combination thereof.

In a particular embodiment, the camera module 106 includes a lens system 110 including one or more physical lenses and an image sensor 112. The lens system 110 may have the field of view 108. The camera module 106 may also have a focus device 114 and an autoexposure device 116 coupled to the lens system 110 and the image sensor 112. The focus device 114 may include one or both of a manual focus mechanism and an autofocus mechanism that is configured to adjust physical properties of the lens system, such as distance between a physical lens and the image sensor, to adjust a focus of an image of a physical object or scene. For example, the focus device 114 may adjust a physical property of the lens system to adjust a focus of an image of the opaque mask 102 that is directed by the lens system 110 and that captured at the image sensor 102 and provided to the processor 120 as image data. As used herein, in some embodiments, a "camera module" includes a camera hardware component including one or more physical lenses, image sensors, and circuitry, that is manufactured and sold to portable device manufacturers to be incorporated in, for example, mobile phones, cellular phones, personal digital assistants (PDAs), music players, laptop computers, notebook computers, desktop monitors, security cameras or web-enabled cameras ("webcams"), any other electronic device that may include a camera, or any combination thereof.

The processor 120 is configured to determine at least one optical characteristic of the camera module 106 based on the two-dimensional impulse response image 124 of the illuminated opaque mask 102. The at least one optical characteristic of the camera module 106 that may be determined by the processor 120 may include focus uniformity, vignetting, tilting of at least one of the lens system 110 and the image sensor 112, geometrical distortion, measurement of a black level, a modulation transfer function of the lens system 110, a de-mosaic check, lateral chromatic aberration, or any combination thereof. The processor 120 may implement at least a portion of an image processing pipeline 122, such as a de-mosaicing module, to process the two-dimensional impulse response image 124 to determine one or more of the tested optical characteristics.

The computer 130 may have a computer-readable medium such as a memory 132 storing computer executable code 134. The memory 132 may include code 134 for initiating an illumination of the opaque mask 102 having the plurality of holes 103 formed therein, each hole of the plurality of holes 103 having a predetermined size. The memory 132 may include code 134 for receiving the two-dimensional impulse response image 124 of the illuminated opaque mask 102 that is formed using the camera module 106 and the processor 120. The memory 132 may include code 134 for determining at least one optical characteristic of the camera module 106 based on the two-dimensional impulse response image 124 of the illuminated opaque mask 102 received from the processor 120.

During operation, the source of illumination 104 illuminates the opaque mask 102 having the plurality of holes 103 formed therein, each hole of the plurality of holes 103 having a predetermined size, forming a two-dimensional impulse response image of the illuminated opaque mask 102 using the camera module 106. The processor 120 then determines at least one optical characteristic of the camera module 106 based on the two-dimensional impulse response image of the illuminated opaque mask 102.

The camera module testing apparatus 100 can use a single target, the illuminated opaque mask 102. The need for precise alignment of the optical elements such as the camera module 106 and the illuminated opaque mask 102 may be reduced in comparison to a conventional camera module testing apparatus. Image analysis by the processor 120 to determine at least one optical characteristic of the camera module 106, based on the two-dimensional impulse response image of the illuminated opaque mask 102, is simplified, enabling a fully automated solution.

Figure 2:
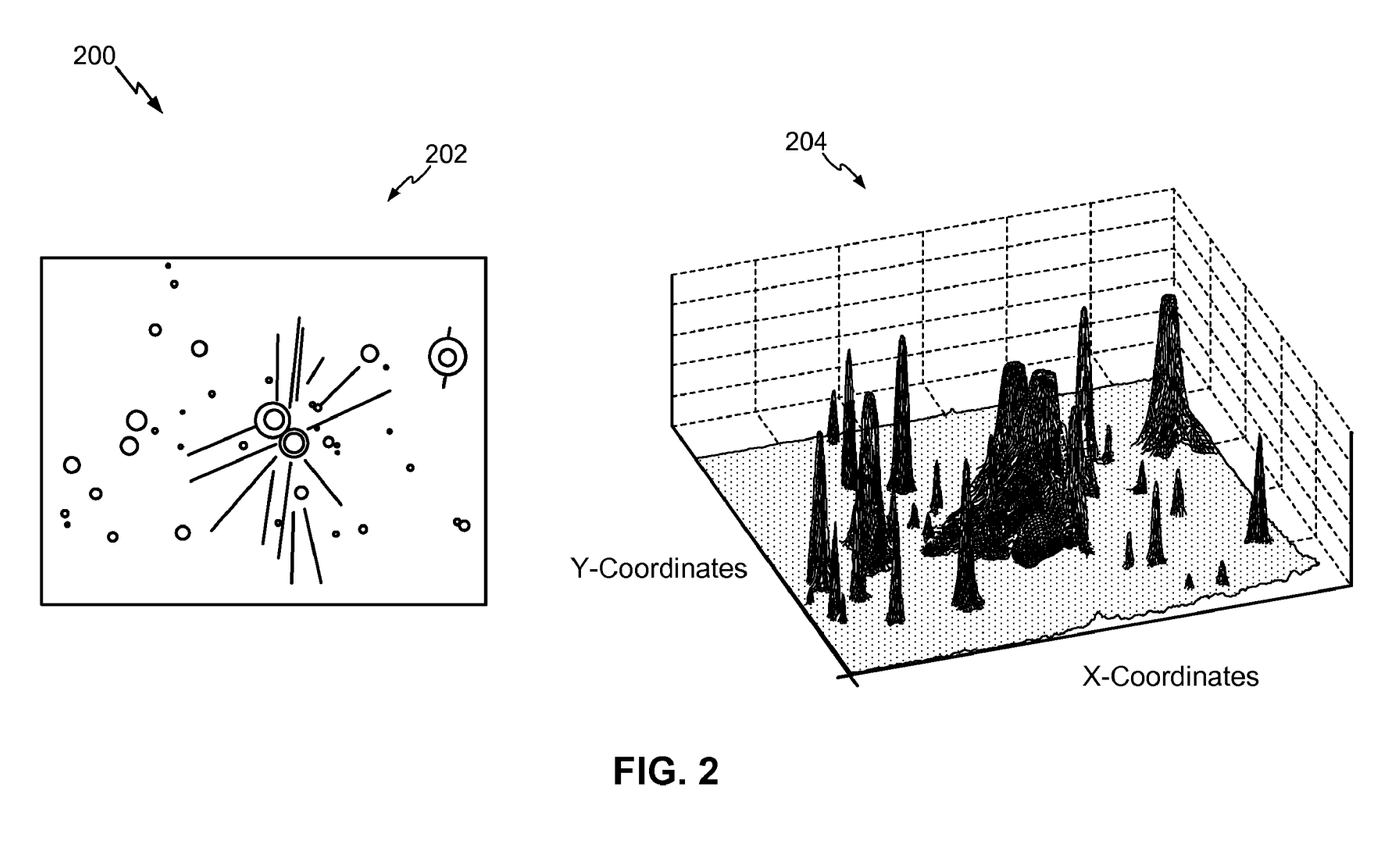
FIG. 2 is an illustration of a two-dimensional impulse response image of a particular embodiment of an illuminated opaque mask having a plurality of holes formed therein.

Referring to FIG. 2, an illustration of a two-dimensional impulse response image of a particular embodiment of an illuminated opaque mask having a plurality of holes formed therein is shown at 200. In a particular embodiment, the illuminated opaque mask having the plurality of holes formed therein is similar to the illuminated opaque mask 102 having the plurality of holes 103 formed therein of FIG. 1, and a two-dimensional impulse response image 202 may be similar to the two-dimensional impulse response image 124 of FIG. 1. The two-dimensional impulse response image 202 of the illuminated opaque mask having the plurality of holes formed therein may be plotted as shown at 204. The plot 204 shows the full width at half maximum for the two-dimensional impulse response image 202 of the illuminated opaque mask having the plurality of holes formed therein. The plot 204 shows the peaks for the two-dimensional impulse response image 202 truncated at half their maximum values, showing the full width of each peak at half the maximum value of each peak. The wider and taller peaks correspond to the larger and more brightly illuminated holes and the narrower and shorter peaks correspond to the smaller and less brightly illuminated holes.

Figure 3:
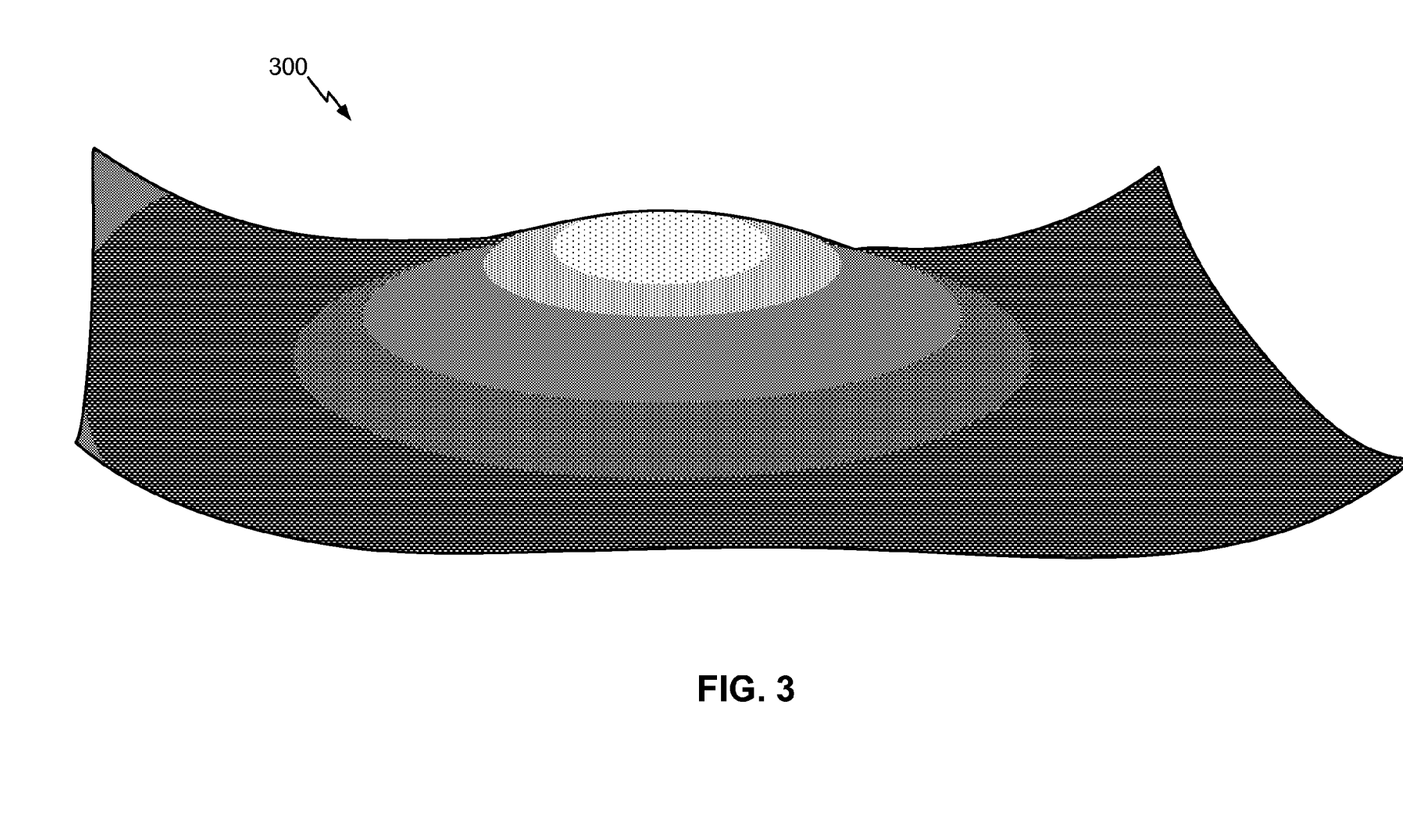
FIG. 3 is an illustration of a particular embodiment of a three-dimensional map generated to show focus performance across at least a portion of a field of view of a lens system of a camera module.

Referring to FIG. 3, an illustration of a three-dimensional map generated to show focus performance across at least a portion of a field of view of a lens system of a camera module is shown at 300. In a particular embodiment, the field of view of the lens system of the camera module is similar to the field of view 108 of the lens system 110 of the camera module 106 of FIG. 1. The darker regions of the three-dimensional map generated to show focus performance across at least a portion of the field of view of the lens system of the camera module indicate increased focus performance. The lighter regions of the three-dimensional map generated to show focus performance across at least a portion of the field of view of the lens system of the camera module indicate decreased focus performance. Generation of such a three-dimensional map from a two-dimensional impulse response image may be used to enable visual inspection of focus performance. However, in some embodiments focus performance may be determined without generating the three-dimensional map for visual inspection.

Figure 4:
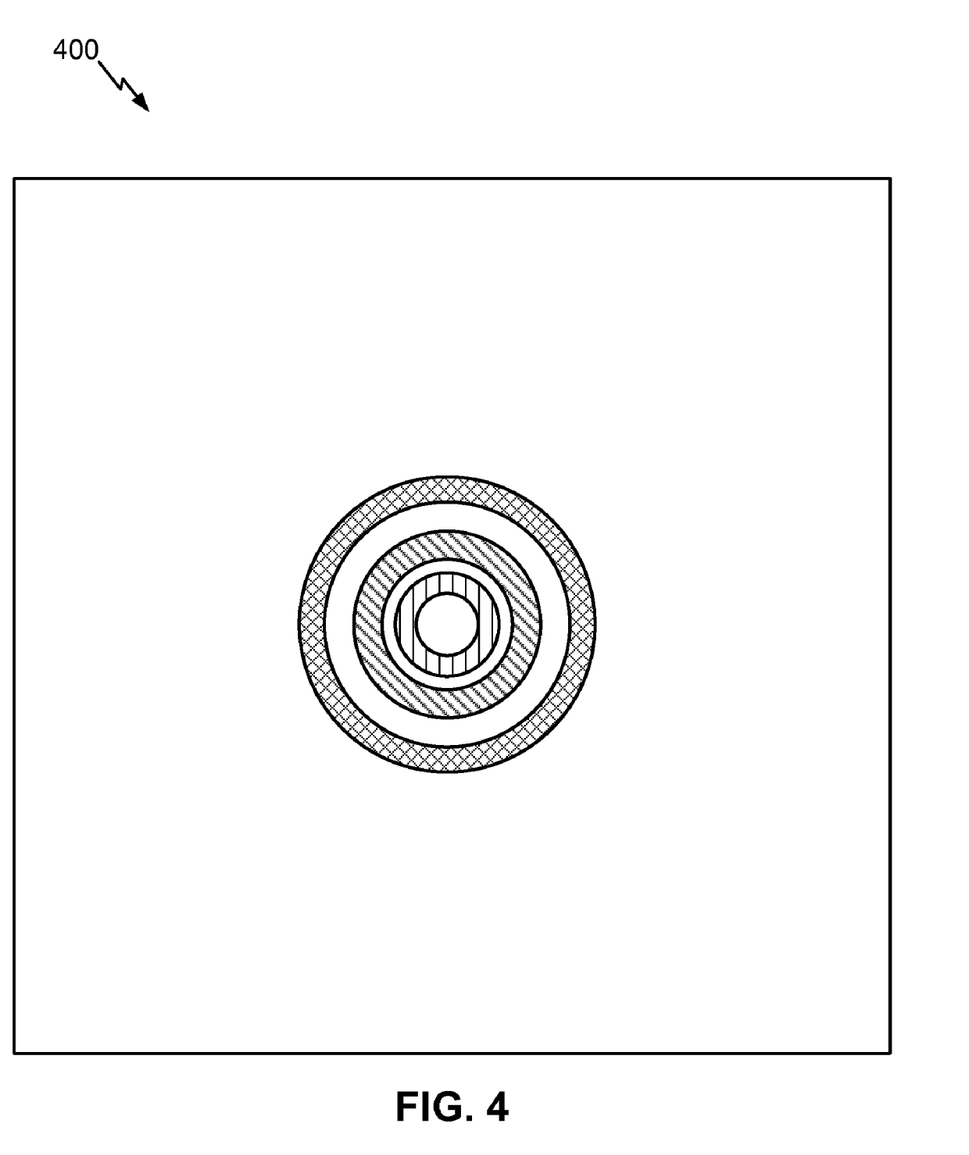
FIG. 4 is an illustration of a particular embodiment of an Airy pattern, a representation of a point spread function of a camera module for one of the plurality of holes that the camera module is unable to resolve.

Referring to FIG. 4, an illustration of a particular embodiment of an Airy pattern, a representation of a point spread function of a camera module for one of the plurality of holes 103 of FIG. 1 that the camera module is unable to resolve, is shown at 400. The Airy pattern has a bright Airy disc at the middle surrounded by dark and light rings. In a particular embodiment, the diameter of the Airy disc is related to the aperture of the lens system 110 of the camera module 106 of FIG. 1 and to the wavelength of the light illuminating the opaque mask 102. The intensity of the Fraunhofer diffraction pattern of a circular aperture, the Airy pattern 400, may be given by $$I(\theta) = I_0 \left( \frac{2J_1(ka \sin\theta)}{ka \sin\theta} \right)^2 = I_0 \left( \frac{2J_1(x)}{x} \right)^2$$

by where $\theta$ is the angle of observation, the angle between the optical axis and the line connecting the center of the aperture with the point of observation in the focal plane, $I_0$ is the maximum intensity at the center of the Airy disc, $J_1(x)$ is the Bessel function of the first kind of order 1, $$k = \frac{2\pi}{\lambda}$$

is the wavenumber for wavelength $\lambda$, a is the radius of the aperture, and $x = ka \sin\theta$. Here $$J_1(x) = -\frac{dJ_0(x)}{dx},$$

where $J_0(x)$ is the Bessel function of the first kind of order 0 given by $$J_0(x) = \sum_{n=0}^{\infty} (-1)^n \frac{x^{2n}}{[(2n)!!]^2}$$

where $(2n)!! = (2n)(2n-2)(2n-4) \ldots (6)(4)(2) = 2^n n!$, so that the Airy function $$\frac{J_1(x)}{x}$$

may be given by $$\frac{J_1(x)}{x} = \sum_{n=0}^{\infty} (-1)^n \frac{x^{2n}}{[(2n)!!]^2 (2n+2)}.$$

The first few zeroes of the Airy function are at $x = ka \sin\theta \approx 3.8317, 7.0156, 10.1735, \ldots$, so that the first minimum of the Airy pattern 400 occurs when $$\sin\theta \approx \frac{3.83}{ka} = \frac{3.83\lambda}{2\pi a} \approx \frac{1.22\lambda}{2a} = \frac{1.22\lambda}{D},$$

where $D = 2a$ is the diameter of the aperture. Since the radius of the Airy disc $\rho = R \sin\theta$, where R is the distance from the center of the aperture to the edge of the Airy disc, the diameter d of the Airy disc of the Airy pattern 400 may be given by $$d = 2\rho = 2R \frac{1.22\lambda}{D}.$$

Deviations from the Airy pattern 400 of the point spread function of a camera module for one of the plurality of holes that the camera module is unable to resolve may be indicative of one or more optical characteristics of the camera module. For example, a point spread function having ellipses instead of the circles of the Airy pattern 400 may indicate an aberration in the lens system 110 of the camera module 106 of FIG. 1. Similarly, a point spread function having shapes like comets instead of the circles of the Airy pattern 400 may indicate a tilting of at least one of the lens system 110 and the image sensor 112 of the camera module 106 of FIG. 1, for example. A separate point spread function of the camera module may be made for each one of the plurality of holes that the camera module is unable to resolve, resulting in a superposition of point spread functions similar to the plot 204 of FIG. 2 that shows the full width at half maximum for the two-dimensional impulse response image 202 of the illuminated opaque mask having the plurality of holes formed therein.

Figure 5:
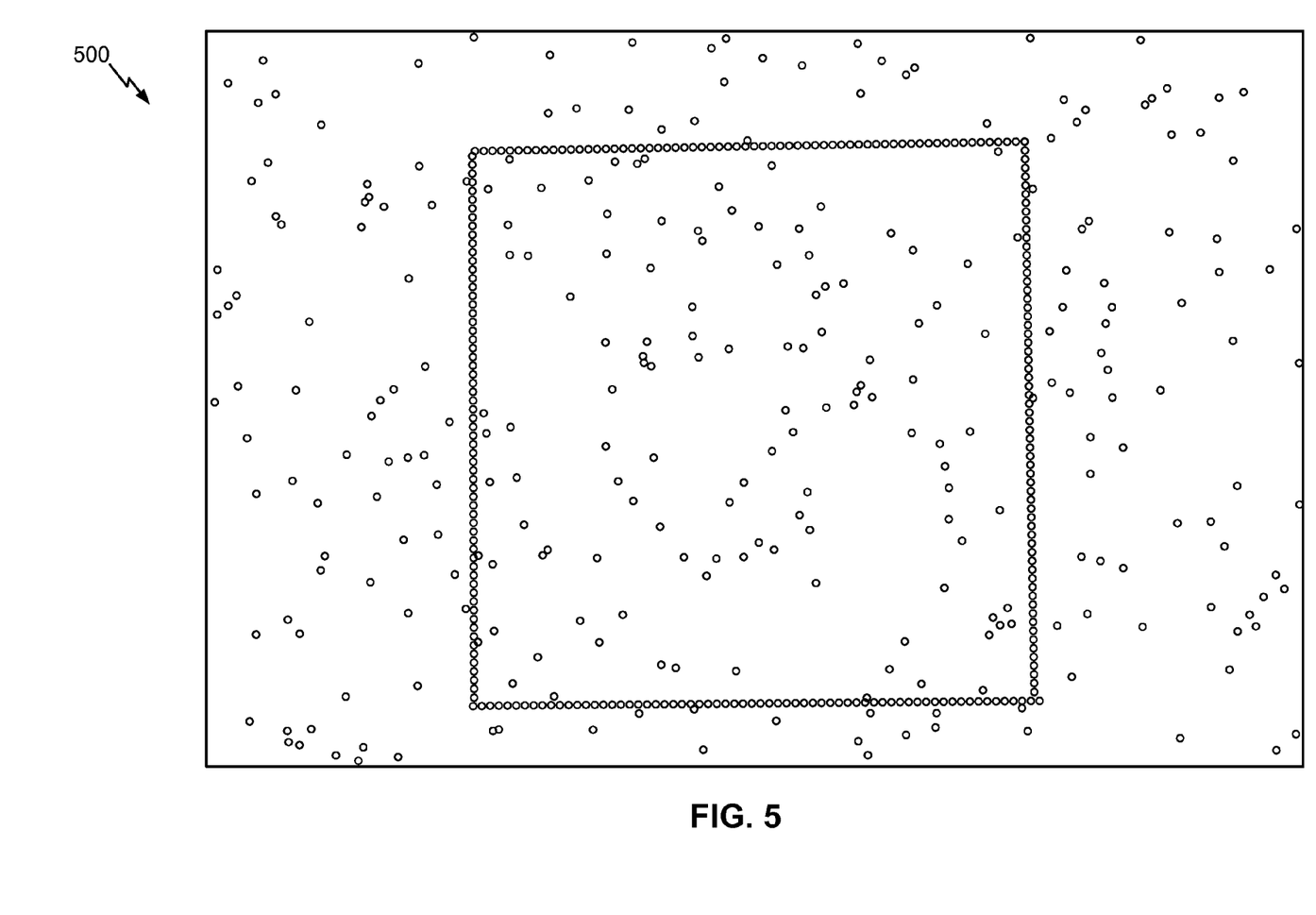
FIG. 5 is an illustration of a particular embodiment of an illuminated opaque mask having a plurality of holes formed therein that may be used to determine geometrical distortion of a camera module.

Referring to FIG. 5, an illustration of an illuminated opaque mask having a plurality of holes formed therein that may be used to determine geometrical distortion of a camera module is shown at 500. An illuminated opaque mask similar to the illuminated opaque mask 102 of FIG. 1 and having a plurality of holes formed therein in the shape of a square or a set of parallel lines may be used to determine geometrical distortions such as "barrel" distortions or "pincushion" distortions of the lens system 110 of the camera module 106. With barrel distortions, the magnification of the image decreases with increasing distance from the optical axis so that lines that do not go through the optical axis appear to bow outwards away from the center of the image. If the square pattern of the holes of the illuminated opaque mask 500 appears to bulge outward, there may be a barrel distortion of the lens system 110 of the camera module 106. With pincushion distortions, the magnification of the image increases with increasing distance from the optical axis so that lines that do not go through the optical axis appear to bow inwards towards the center of the image. If the square pattern of the holes of the illuminated opaque mask 500 appears to bulge inward, there may be a pincushion distortion of the lens system 110 of the camera module 106.

Figure 6:
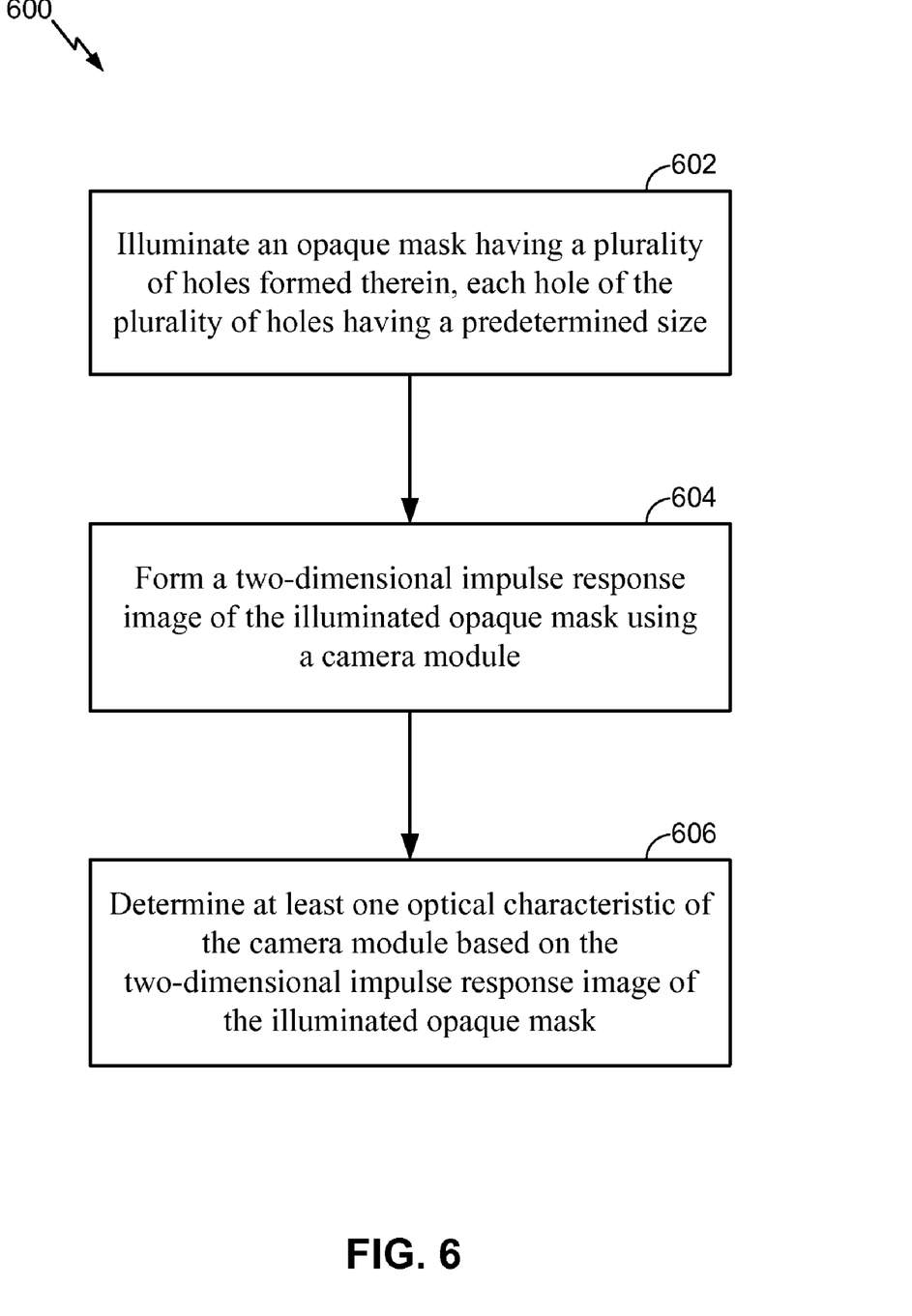
FIG. 6 is a flow diagram of a first illustrative embodiment of a method to determine at least one optical characteristic of a camera module.

Referring to FIG. 6, a flow diagram of a first illustrative embodiment of a method to determine at least one optical characteristic of a camera module is shown at 600. The method 600 includes illuminating an opaque mask having a plurality of holes formed therein, each hole of the plurality of holes having a predetermined size, at 602. For example, the opaque mask 102 of FIG. 1 having the plurality of holes 103 may be illuminated by the source of illumination 104.

The method 600 also includes forming a two-dimensional impulse response image of the illuminated opaque mask using a camera module, at 604. For example, a two-dimensional impulse response image of the illuminated opaque mask 102 of FIG. 1 may be formed using the camera module 106. The two-dimensional impulse response image 202 of FIG. 2 of the illuminated opaque mask 102 having the plurality of holes 103 formed therein may be plotted as shown at 204. The plot 204 shows the full width at half maximum for the two-dimensional impulse response image 202 of the illuminated opaque mask 102 having the plurality of holes 103 formed therein.

The method 600 further includes determining at least one optical characteristic of the camera module based on the two-dimensional impulse response image of the illuminated opaque mask, at 606. For example, at least one optical characteristic of the camera module 106 of FIG. 1 may be determined by the processor 120 based on the two-dimensional impulse response image of the illuminated opaque mask 102.

In a particular embodiment, the predetermined size of the plurality of holes 103 of FIG. 1 is such that the camera module 106, including the lens system 110 and the image sensor 112, is unable to resolve at least one of the plurality of holes 103. The diameter of the at least one of the plurality of holes 103 that is unable to be resolved by the camera module 106 may be in the sub-millimeter range and may depend on the resolving power of the lens system 110 and the image sensor 112. The at least one of the plurality of holes 103 that is unable to be resolved by the camera module 106 may be treated as a point source of light for the camera module 106. In a particular embodiment, the two-dimensional impulse response image of the illuminated opaque mask 102 includes a point spread function of the camera module 106 for the at least one of the plurality of holes 103 that is unable to be resolved by the camera module 106.

In a particular embodiment, the at least one optical characteristic of the camera module 106 of FIG. 1 includes focus uniformity. For example, deviations from the Airy pattern 400 of FIG. 4 of the point spread function of the camera module 106 for one of the plurality of holes 103 that the camera module 106 is unable to resolve may be indicative of a decrease of focus uniformity of the camera module 106. A point spread function having ellipses instead of the circles of the Airy pattern 400 may indicate an aberration in the lens system 110 of the camera module 106 that may result in a decrease of focus uniformity of the camera module 106, for example.

In a particular embodiment, the three-dimensional map 300 of FIG. 3 is generated to show focus performance across at least a portion of the field of view 108 of the lens system 110 of the camera module 106. The darker regions of the three-dimensional map 300 may indicate increased focus performance. The lighter regions of the three-dimensional map 300 may indicate decreased focus performance.

In a particular embodiment, the at least one optical characteristic of the camera module 106 of FIG. 1 includes vignetting. Vignetting or lens roll-off may be a reduction of an image's brightness at the periphery of the image compared to the image's brightness at the center of the image. Vignetting or illumination falloff may be approximated by the $\cos^4 \phi$ law of illumination falloff, where $\phi$ is the angle at which light impinges on the image sensor 112 of the camera module 106. Vignetting of the camera module 106 may be determined based on the two-dimensional impulse response image of the illuminated opaque mask 102, particularly at the edges of the lens system 110. For example, for identical holes at the periphery of the illuminated opaque mask 102 and at the center of the illuminated opaque mask 102, the height of the corresponding peaks of the two-dimensional impulse response image of the illuminated opaque mask 102 should be about the same. If the heights are different, such that the peak corresponding to the hole at the periphery is shorter than the peak corresponding to the hole at the center, then there may be an indication of a certain amount of vignetting of the camera module 106.

In a particular embodiment, the at least one optical characteristic of the camera module 106 of FIG. 1 includes tilting of at least one of the lens system 110 and the image sensor 112. For example, deviations from the Airy pattern 400 of FIG. 4 of the point spread function of the camera module 106 for one of the plurality of holes 103 that the camera module 106 is unable to resolve may be indicative of a tilting of at least one of the lens system 110 and the image sensor 112. A point spread function having shapes like comets instead of the circles of the Airy pattern 400 may indicate a tilting of at least one of the lens system 110 and the image sensor 112, for example.

In a particular embodiment, the at least one optical characteristic of the camera module 106 of FIG. 1 includes geometric distortion. For example, the illuminated opaque mask 500 having a plurality of holes formed therein in the shape of a square or a set of parallel lines may be used to determine geometrical distortions such as "barrel" distortions or "pincushion" distortions of the lens system 110 of the camera module 106. With barrel distortions, the magnification of the image decreases with increasing distance from the optical axis so that lines that do not go through the optical axis appear to bow outwards away from the center of the image. If the square pattern of the holes of the illuminated opaque mask 500 appears to bulge outward, there may be a barrel distortion of the lens system 110 of the camera module 106. With pincushion distortions, the magnification of the image increases with increasing distance from the optical axis so that lines that do not go through the optical axis appear to bow inwards towards the center of the image. If the square pattern of the holes of the illuminated opaque mask 500 appears to bulge inward, there may be a pincushion distortion of the lens system 110 of the camera module 106.

In a particular embodiment, the at least one optical characteristic of the camera module 106 of FIG. 1 includes measurement of a black level. For example, where the illuminated opaque mask 102 may be dark, such as between holes of the plurality of holes 103, there should be no signal. In a particular embodiment, the testing occurs in a darkened location. Measurement of a signal where the illuminated opaque mask 102 should be dark may indicate a DC bias on the image sensor 112. Measurement of the black level of the camera module 106 may be determined based on the two-dimensional impulse response image of the illuminated opaque mask 102, particularly between holes of the plurality of holes 103.

In a particular embodiment, the at least one optical characteristic of the camera module 106 of FIG. 1 includes a modulation transfer function of the lens system 110 of the camera module 106. The optical transfer function may be the Fourier transform into the spatial frequency domain of the point spread function. The magnitude of the optical transfer function may be the modulation transfer function. For example, the magnitude of the Fourier transform into the spatial frequency domain of the point spread function of the camera module 106 for one of the plurality of holes 103 that the camera module 106 is unable to resolve may be a modulation transfer function of the lens system 110 of the camera module 106.

In a particular embodiment, the at least one optical characteristic of the camera module 106 of FIG. 1 includes resolution. For example, holes of varying and different predetermined sizes among the plurality of holes 103 of the illuminated opaque mask 102 may be used to determine how small a hole may be to still be resolved by the camera module 106. Alternatively, various hole spacings between some of the plurality of holes 103 of the illuminated opaque mask 102 may be used to determine how close together two holes may be to still be resolved by the camera module 106. In a particular embodiment, the hole sizes and the spacings between respective holes are measured in arcseconds. The resolution of the camera module 106 may depend on the f-number of the lens of the lens system 110. The resolution of the camera module 106 may depend on the pixel size of pixels of the image sensor 112.

In a particular embodiment, the at least one optical characteristic of the camera module 106 of FIG. 1 includes a de-mosaic check. Generally, a de-mosaic process is a digital image process used to reconstruct a full color image from the incomplete color samples output by an image sensor overlaid by a color filter array. A de-mosaic check of the camera module 106 may be performed using the two-dimensional impulse response image of the illuminated opaque mask 102. For example, portions of the two-dimensional impulse response image of the illuminated opaque mask 102 may illuminate several pixels in a color filter array at the image sensor 112. The subsequent de-mosaic process should reconstruct the full color image of the respective portions of the two-dimensional impulse response image of the illuminated opaque mask 102. The degree to which the de-mosaic process successfully reconstructs the full color image of the respective portions of the two-dimensional impulse response image of the illuminated opaque mask 102 is a check of the de-mosaic process.

In a particular embodiment, the at least one optical characteristic of the camera module 106 of FIG. 1 includes a lateral chromatic aberration. For example, separate red, green, and blue light sources of illumination 104 may be used to form three separate two-dimensional impulse response images of the illuminated opaque mask 102. Differences between the respective two-dimensional impulse response images of the illuminated opaque mask 102 may be indicative of a lateral chromatic aberration of the camera module 106.

Figure 7:
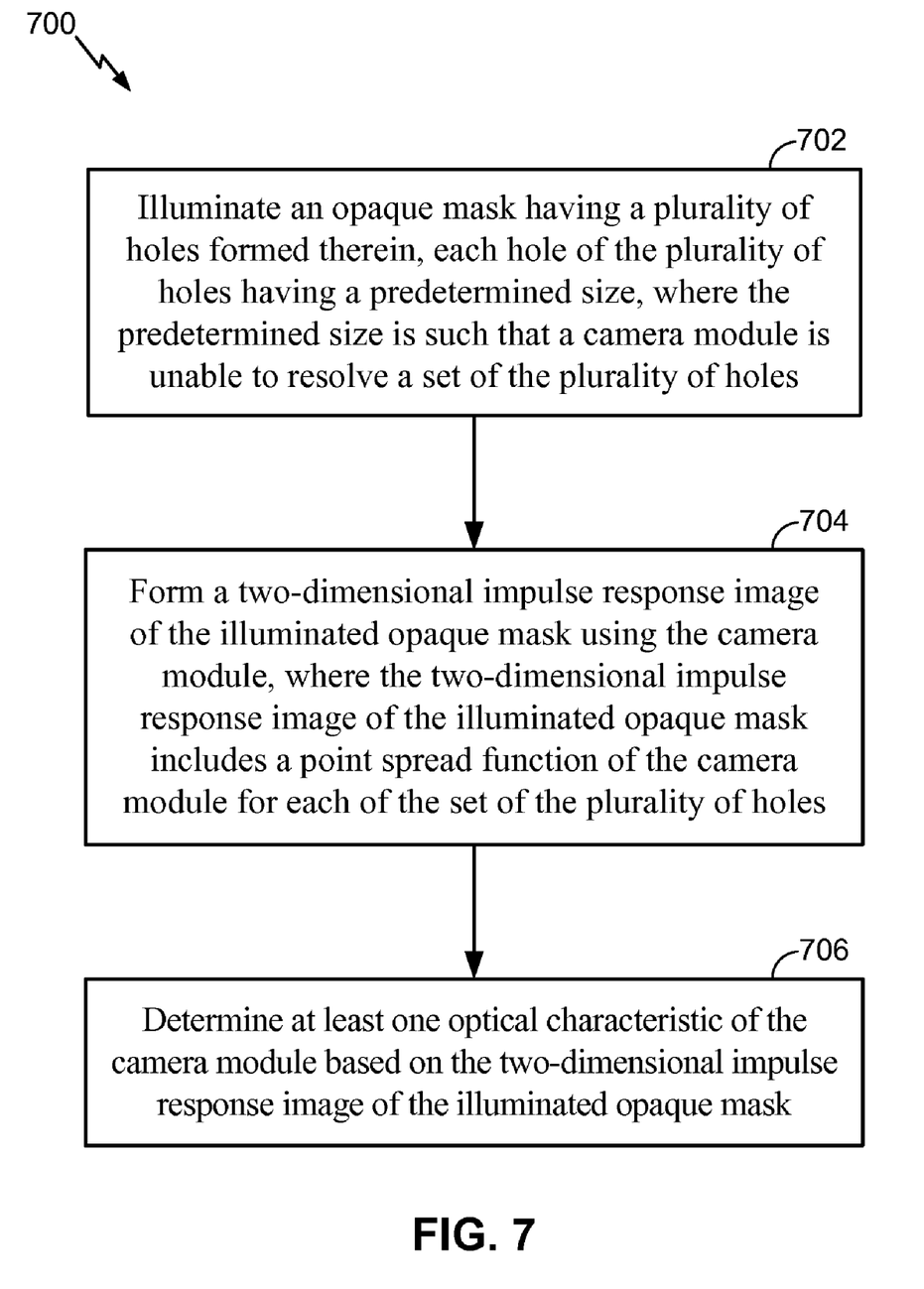
FIG. 7 is a flow diagram of a second illustrative embodiment of a method to determine at least one optical characteristic of a camera module.

Referring to FIG. 7, a flow diagram of a second illustrative embodiment of a method to determine at least one optical characteristic of a camera module is shown at 700. The method 700 includes illuminating an opaque mask having a plurality of holes formed therein, each hole of the plurality of holes having a predetermined size, where the predetermined size is such that a camera module is unable to resolve a set of the plurality of holes, at 702. For example, the opaque mask 102 of FIG. 1 having the plurality of holes 103 may be illuminated by the source of illumination 104.

The method 700 also includes forming a two-dimensional impulse response image of the illuminated opaque mask using a camera module, where the two-dimensional impulse response image of the illuminated opaque mask includes a point spread function of the camera module for each hole of the set of the plurality of holes, at 704. For example, a two-dimensional impulse response image of the illuminated opaque mask 102 of FIG. 1 may be formed using the camera module 106. The two-dimensional impulse response image 202 of FIG. 2 of the illuminated opaque mask 102 having the plurality of holes 103 formed therein may be plotted as shown at 204. The plot 204 shows the full width at half maximum for the two-dimensional impulse response image 202 of the illuminated opaque mask 102 having the plurality of holes 103 formed therein. For each hole of the set of the plurality of holes 103 that the camera module 106 is unable to resolve, the two-dimensional impulse response image of the illuminated opaque mask 102 may include a point spread function of the camera module 106.

The method 700 further includes determining at least one optical characteristic of the camera module based on the two-dimensional impulse response image of the illuminated opaque mask, at 706. For example, at least one optical characteristic of the camera module 106 of FIG. 1 may be determined by the processor 120 based on the two-dimensional impulse response image of the illuminated opaque mask 102.

In a particular embodiment, the at least one optical characteristic of the camera module 106 of FIG. 1 includes focus uniformity and the three-dimensional map 300 of FIG. 3 is generated to show focus performance across at least a portion of the field of view 108 of the lens system 110 of the camera module 106. For example, deviations from the Airy pattern 400 of FIG. 4 of the point spread function of the camera module 106 for one of the set of the plurality of holes 103 that the camera module 106 is unable to resolve may be indicative of a decrease of focus uniformity of the camera module 106. A point spread function having ellipses instead of the circles of the Airy pattern 400 may indicate an aberration in the lens system 110 of the camera module 106 that may result in a decrease of focus uniformity of the camera module 106, for example. The darker regions of the three-dimensional map 300 may indicate increased focus performance. The lighter regions of the three-dimensional map 300 may indicate decreased focus performance.

In a particular embodiment, the camera module 106 is unable to resolve the set of the plurality of holes 103 such that each hole of the set of the plurality of holes 103 is a point source of light for the camera module 106 and the at least one optical characteristic of the camera module 106 of FIG. 1 includes a modulation transfer function of the lens system 110 of the camera module 106. The optical transfer function may be the Fourier transform into the spatial frequency domain of the point spread function. The magnitude of the optical transfer function may be the modulation transfer function. For example, the magnitude of the Fourier transform into the spatial frequency domain of the point spread function of the camera module 106 for one of the set of the plurality of holes 103 that the camera module 106 is unable to resolve may be a modulation transfer function of the lens system 110 of the camera module 106.

In a particular embodiment, an apparatus is disclosed that includes means for illuminating an opaque mask having a plurality of holes formed therein, each hole of the plurality of holes having a predetermined size. The means for illuminating an opaque mask having a plurality of holes formed therein may include an incoherent source of illumination such as an incandescent bulb, a halogen lamp, an array of light-emitting diodes (LEDs), a coherent source of illumination such as a laser, or any combination thereof. The apparatus includes means for forming a two-dimensional impulse response image of the illuminated opaque mask using a camera module. The means for forming a two-dimensional impulse response image of the illuminated opaque mask may include a lens system, an image sensor, a focusing device, an autoexposure device, or any combination thereof. The apparatus further includes means for determining at least one optical characteristic of the camera module based on the two-dimensional impulse response image of the illuminated opaque mask. The means for determining at least one optical characteristic of the camera module may include a processor, processing circuitry, corresponding hardware, software, firmware, or any combination thereof.

Figure 8:
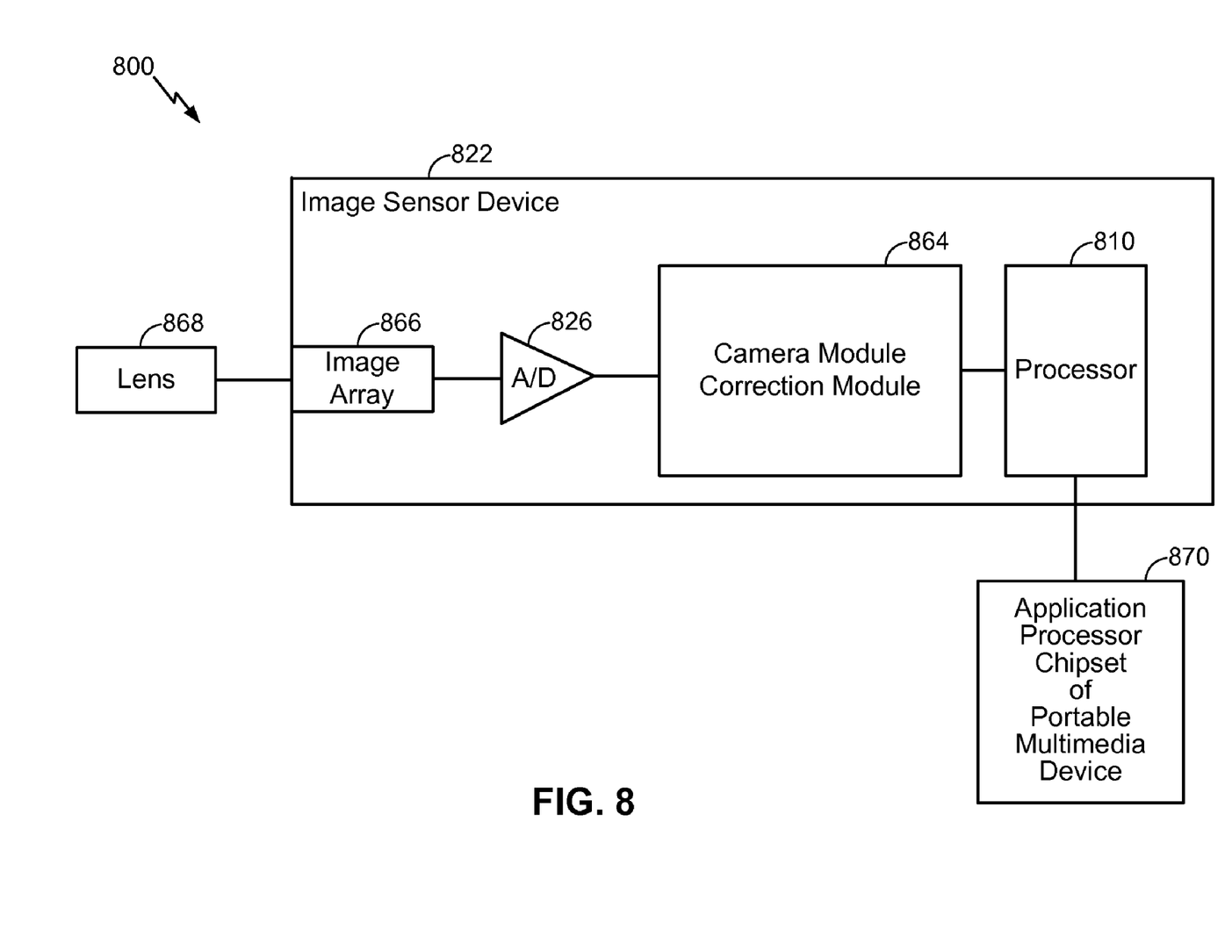
FIG. 8 is a block diagram of a particular embodiment of a device including a camera module correction module.

FIG. 8 is a block diagram of particular embodiment of a system including a camera module correction module. The system 800 includes an image sensor device 822 that is coupled to a lens 868 and also coupled to an application processor chipset of a portable multimedia device 870. The image sensor device 822 includes a camera module correction module 864 to correct either or both of a lens system and an image sensor in a camera module. The camera module corrections to be applied may be previously determined, such as by implementing one or more of the systems illustrated in FIGS. 1-5, by operating in accordance with any of the embodiments of FIGS. 6-7, or any combination thereof.

The camera module correction module 864 is coupled to receive image data from an image array 866, such as via an analog-to-digital convertor 826 that is coupled to receive an output of the image array 866 and to provide the image data to the camera module correction module 864.

The image sensor device 822 may also include a processor 810. In a particular embodiment, the processor 810 is configured to implement the camera module correction module 864. In another embodiment, the camera module correction module 864 is implemented as image processing circuitry.

The processor 810 may also be configured to perform additional image processing operations, such as one or more of the operations performed by an image processing system. The processor 810 may provide processed image data to the application processor chipset of the portable multimedia device 870 for further processing, transmission, storage, display, or any combination thereof.

Figure 9:
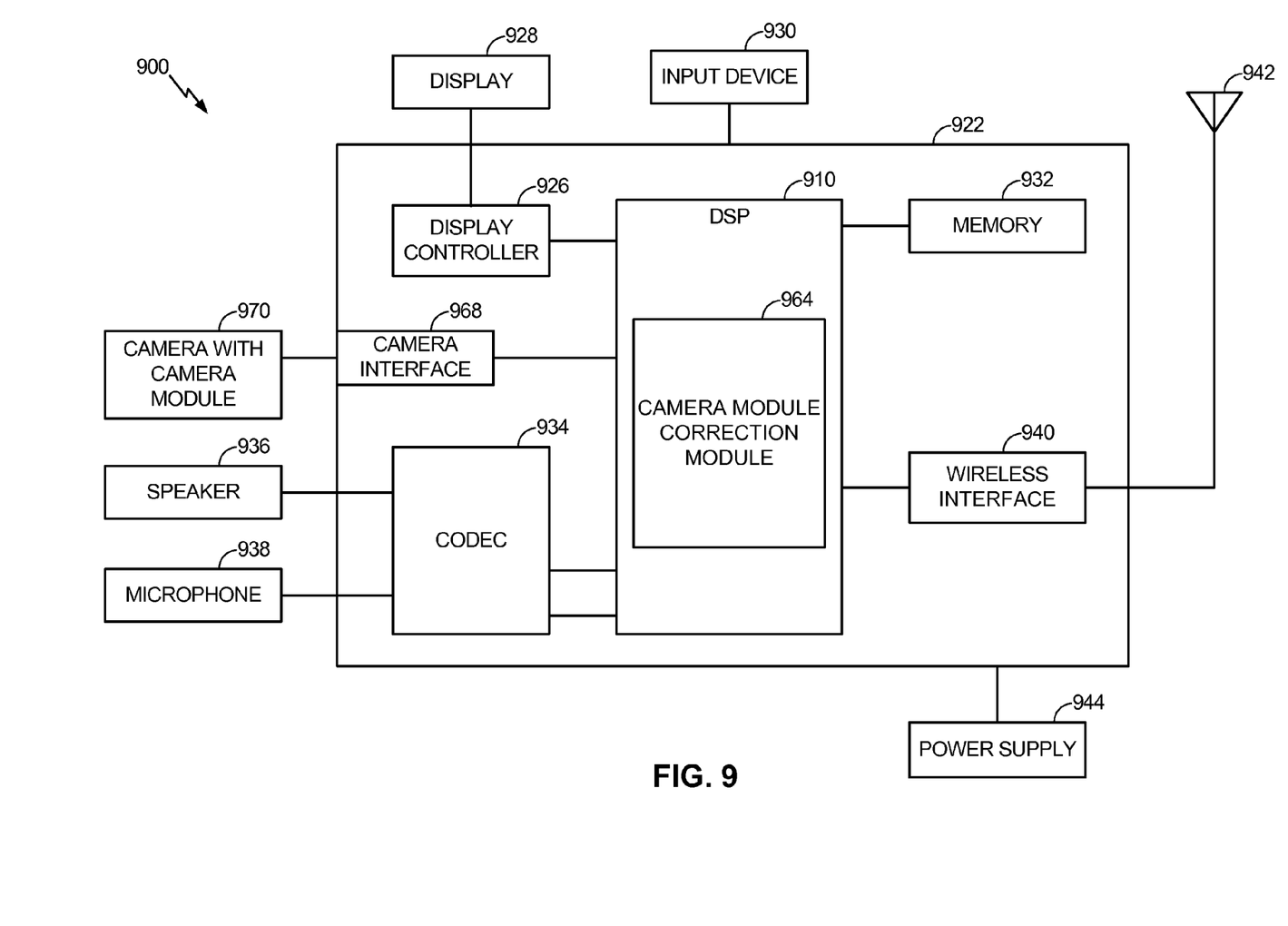
FIG. 9 is a block diagram of a particular embodiment of a portable communication device including a camera module correction module.

FIG. 9 is a block diagram of particular embodiment of a system including a camera module correction module. The system 900 may be implemented in a portable electronic device and includes a processor 910, such as a digital signal processor (DSP), coupled to a memory 932. The system 900 includes a camera module correction module 964. In an illustrative example, the camera module correction module 964 corrects either or both of a lens system and an image sensor in a camera module of a camera 970. The camera module corrections to be applied may be previously determined, such as by implementing one or more of the systems illustrated in FIGS. 1-5, by operating in accordance with any of the embodiments of FIGS. 6-7, or any combination thereof. The camera module correction module 964 may be in the processor 910 or may be a separate device or circuitry along a hardware image processing pipeline (not shown), or a combination thereof.

A camera interface 968 is coupled to the processor 910 and also coupled to a camera, such as the camera with camera module 970, which may be a video camera or a still camera. The camera interface 968 may be responsive to the processor 910, such as for autofocusing and autoexposure control. A display controller 926 is coupled to the processor 910 and to a display device 928. A coder/decoder (CODEC) 934 can also be coupled to the processor 910. A speaker 936 and a microphone 938 can be coupled to the CODEC 934. A wireless interface 940 can be coupled to the processor 910 and to a wireless antenna 942.

The processor 910 may also be adapted to generate processed image data. The display controller 926 is configured to receive the processed image data and to provide the processed image data to the display device 928. In addition, the memory 932 may be configured to receive and to store the processed image data, and the wireless interface 940 may be configured to receive the processed image data for transmission via the antenna 942.

In a particular embodiment, the processor 910, the display controller 926, the memory 932, the CODEC 934, the wireless interface 940, and the camera interface 968 are included in a system-in-package or system-on-chip device 922. In a particular embodiment, an input device 930 and a power supply 944 are coupled to the system-on-chip device 922. Moreover, in a particular embodiment, as illustrated in FIG. 9, the display device 928, the input device 930, the speaker 936, the microphone 938, the wireless antenna 942, the camera with camera module 970, and the power supply 944 are external to the system-on-chip device 922. However, each of the display device 928, the input device 930, the speaker 936, the microphone 938, the wireless antenna 942, the camera with camera module 970, and the power supply 944 can be coupled to a component of the system-on-chip device 922, such as an interface or a controller.

Those of skill would further appreciate that the various illustrative logical blocks, configurations, modules, circuits, and algorithm steps described in connection with the embodiments disclosed herein may be implemented as electronic hardware, computer software executing at a computer, or combinations of both. Therefore, various illustrative components, blocks, configurations, modules, circuits, and steps have been described above generally in terms of their functionality. Whether such functionality is implemented as hardware or as a programmed processing element depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disk read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined by the following claims.

The invention claimed is:

1. A method comprising:
   illuminating an opaque mask having a plurality of holes formed therein, each hole of the plurality of holes having a predetermined size;
   forming a two-dimensional impulse response image of the illuminated opaque mask using a camera module; and
   determining at least one optical characteristic of the camera module based on the two-dimensional impulse response image of the illuminated opaque mask.

2. The method of claim 1, wherein the predetermined size is such that the camera module including a lens system and an image sensor is unable to resolve at least one of the plurality of holes.

3. The method of claim 2, wherein the two-dimensional impulse response image of the illuminated opaque mask includes a point spread function of the camera module for the at least one of the plurality of holes.

4. The method of claim 1, wherein the at least one optical characteristic of the camera module includes focus uniformity.

5. The method of claim 4, wherein a three-dimensional map is generated to show focus performance across at least a portion of a field of view of a lens system of the camera module.

6. The method of claim 1, wherein the at least one optical characteristic of the camera module includes vignetting.

7. The method of claim 1, wherein the camera module includes a lens system and an image sensor, and wherein the at least one optical characteristic of the camera module includes tilting of at least one of the lens system and the image sensor.

8. The method of claim 1, wherein the at least one optical characteristic of the camera module includes geometric distortion.

9. The method of claim 1, wherein the at least one optical characteristic of the camera module includes measurement of a black level.

10. The method of claim 1, wherein the at least one optical characteristic of the camera module includes a modulation transfer function of a lens system of the camera module.

11. The method of claim 1, wherein the at least one optical characteristic of the camera module includes resolution.

12. The method of claim 1, wherein the at least one optical characteristic of the camera module includes a de-mosaic check.

13. The method of claim 1, wherein the at least one optical characteristic of the camera module includes a lateral chromatic aberration.

14. A method comprising:
   illuminating an opaque mask having a plurality of holes formed therein, each hole of the plurality of holes having a predetermined size, wherein the predetermined size is such that a camera module is unable to resolve a set of the plurality of holes;
   forming a two-dimensional impulse response image of the illuminated opaque mask using the camera module, wherein the two-dimensional impulse response image of the illuminated opaque mask includes a point spread function of the camera module for each hole of the set of the plurality of holes; and
   determining at least one optical characteristic of the camera module based on the two-dimensional impulse response image of the illuminated opaque mask.

15. The method of claim 14, wherein the at least one optical characteristic of the camera module includes focus uniformity, and wherein a three-dimensional map is generated to show focus performance across at least a portion of a field of view of a lens system of the camera module.

16. The method of claim 14, wherein the camera module is unable to resolve the set of the plurality of holes such that each hole of the set of the plurality of holes is a point source of light for the camera module, and wherein the at least one optical characteristic of the camera module includes a modulation transfer function of a lens system of the camera module.

17. An apparatus comprising:
   an opaque mask having a plurality of holes formed therein, each hole of the plurality of holes having a predetermined size;
   a source of illumination configured to illuminate the opaque mask forming a two-dimensional impulse response image of the illuminated opaque mask using a camera module; and a processor configured to determine at least one optical characteristic of the camera module based on the two-dimensional impulse response image of the illuminated opaque mask.

18. The apparatus of claim 17, wherein the at least one optical characteristic of the camera module includes focus uniformity, and wherein a three-dimensional map is generated by the processor to show focus performance across at least a portion of a field of view of a lens system of the camera module.

19. The apparatus of claim 17, wherein the predetermined size is such that the camera module is unable to resolve a set of the plurality of holes and wherein the two-dimensional impulse response image of the illuminated opaque mask includes a point spread function of the camera module for each hole of the set of the plurality of holes.

20. An apparatus comprising:
    means for illuminating an opaque mask having a plurality of holes formed therein, each hole of the plurality of holes having a predetermined size;
    means for forming a two-dimensional impulse response image of the illuminated opaque mask using a camera module; and
    means for determining at least one optical characteristic of the camera module based on the two-dimensional impulse response image of the illuminated opaque mask.

21. The apparatus of claim 20, wherein the at least one optical characteristic of the camera module includes focus uniformity.

22. The apparatus of claim 20, wherein the predetermined size is such that the camera module is unable to resolve a set of the plurality of holes and wherein the two-dimensional impulse response image of the illuminated opaque mask includes a point spread function of the camera module for each hole of the set of the plurality of holes.

23. A computer-readable medium storing computer executable code comprising:
    code for initiating an illumination of an opaque mask having a plurality of holes formed therein, each hole of the plurality of holes having a predetermined size;
    code for receiving a two-dimensional impulse response image of the illuminated opaque mask that is formed using a camera module; and
    code for determining at least one optical characteristic of the camera module based on the two-dimensional impulse response image of the illuminated opaque mask.

24. The computer-readable medium of claim 23, wherein the at least one optical characteristic of the camera module includes focus uniformity.

25. The computer-readable medium of claim 23, wherein the predetermined size is such that the camera module is unable to resolve a set of the plurality of holes and wherein the two-dimensional impulse response image of the illuminated opaque mask includes a point spread function of the camera module for each hole of the set of the plurality of holes.

* * * * *